Oct. 10, 1944.  A. P. WATTS ET AL  2,360,292
PROCESS AND APPARATUS FOR FIRING CERAMIC WARE
Filed Dec. 4, 1941
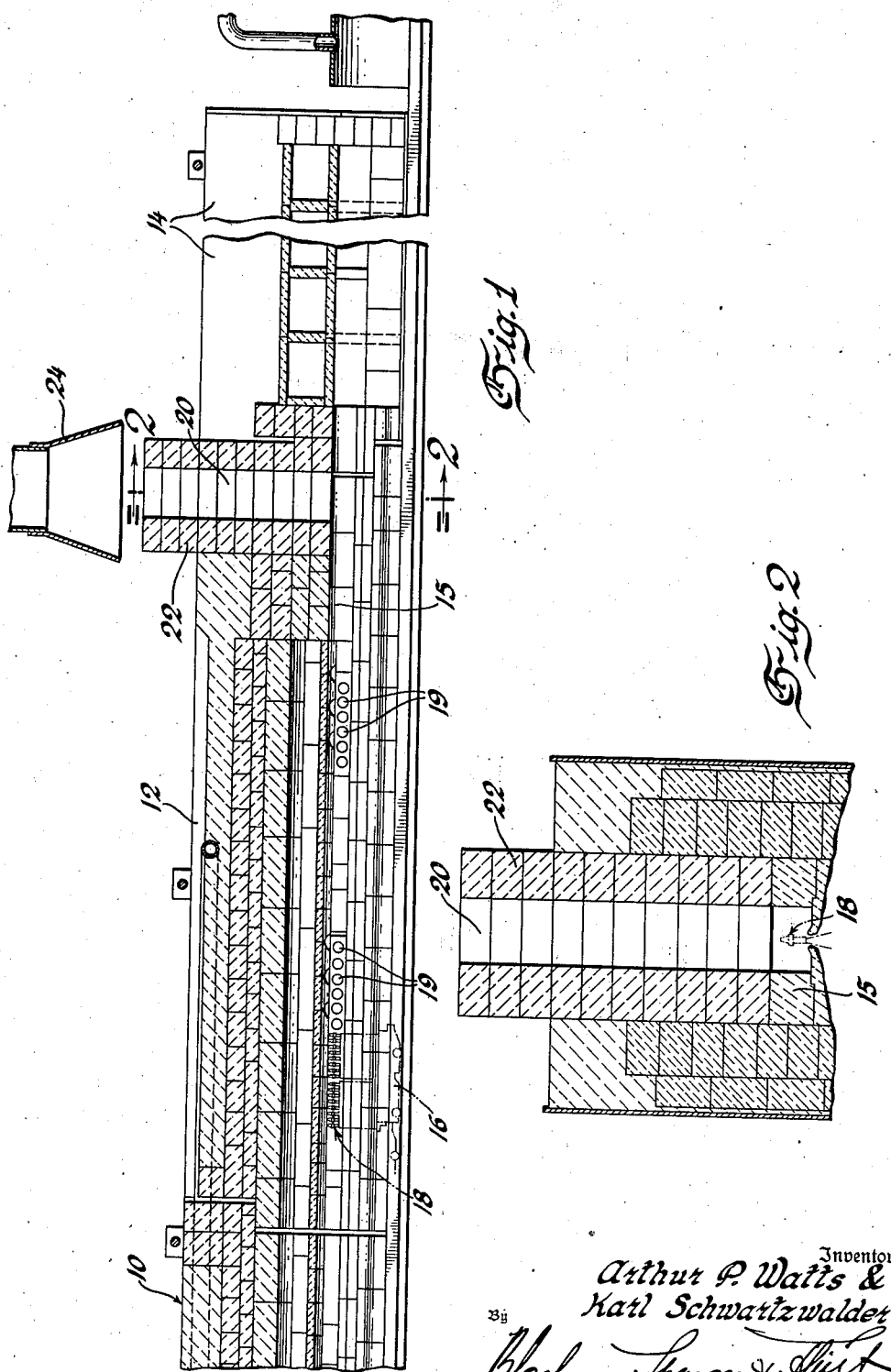

Patented Oct. 10, 1944

2,360,292

UNITED STATES PATENT OFFICE 2,360,292

PROCESS AND APPARATUS FOR FIRING CERAMIC WARE

Arthur P. Watts, Flint, and Karl Schwartzwalder, Holly, Mich., assignors to General Motors Corporation, Detroit, Mich., a corporation of Delaware Application December 4, 1941, Serial No. 421,582

5 Claims. (Cl. 25—142)

This invention relates to improvements in the process and apparatus for firing ceramic ware. The invention relates particularly to kilns of the continuous or tunnel type such as disclosed and claimed in Patent 2,137,091 to McDougal.

In the firing of ceramic ware such as spark plug insulators it has been found that mineral vapors are picked up by the hot gases in passing through the kiln. The source of the vapors is probably the ware itself, and what is called the "kiln furniture," such as the conveyor equipment, the refractory supports for the ware, the kiln walls, and the like. These vapors deposit on the insulator surfaces. The deposits have been found to be the oxides of sodium and gallium to a considerable degree, together with lead, tin and iron oxides and the like to a lesser degree. The deposit which forms on the insulator adheres quite tenaciously thereto.

So far as has been determined, the coating or deposit was itself not found in any instance to be electrically conducting either at room temperatures or at temperatures to which the insulator would be subjected in service. It appears rather certain, however, that the lower Te, or high temperature electrical resistance value, results not from the presence of the coating itself but from absorption by the insulator structure of the kiln vapors which produce the surface coating. It appears, however, that unless the coating itself is removed the insulator picks up carbon quite readily in subsequent heat treatments to which it will be exposed in the course of manufacture of the spark plug. One such heat treatment, for example, is that which is necessary to soften the glass seal as explained in Patent 2,248,415 to Schwartzwalder et al. The carbon thus picked up gives the insulator an undesirable appearance. Moreover, the oxides present in the coating would be highly reactive with the salts and impurities present in high test gasolines. For these reasons elimination of the oxide coating or deposit is highly desirable.

A method developed to eliminate the deposits consists in removing the kiln gases which contain the vapors while the gases are at a temperature above the condensation temperature of those vapors.

It is the object of this invention to provide a process of firing ceramic ware which produces articles superior in appearance, and in resistance to the passage of electric current at high temperatures. This object is achieved by a firing process carried out in a tunnel kiln in which ceramic ware may be fired without the deposit of objectionable oxides on the ware. This may be accomplished by providing a vent in the tunnel kiln which permits the removal of mineral vapors contributing to the deposit of oxide coatings before said vapors have had an opportunity to condense on the surface of the ceramic ware. The quality of the ware is further improved by operating the burners in the firing zone in such a way as to leave no uncombined oxygen in the gases flowing towards the ware exit end of the zone.

Figure 1 of the drawing shows a longitudinal sectional view of that portion of a tunnel kiln to which this invention is applicable, and Figure 2 is a view in section substantially on line 2—2 of Figure 1.

As best seen in Figure 1, the drawing shows a tunnel kiln indicated generally by 10. This kiln is substantially identical with the tunnel kiln shown in the above mentioned patent to McDougal, 2,137,091. Only that portion of the kiln pertinent to the invention is reproduced here. The portion shown in Figure 1 comprises a firing zone 12 and a cooling zone 14 separated by a baffle portion 15. Means for continuously passing ceramic ware to be fired through these zones is shown at 16. This means may, if desired, be identical with the grooved track and car system shown in the above cited McDougal patent. The car is shown as carrying a plurality of spark plug insulators indicated generally by 18. Although the illustrated conveyor is shown as carrying only a single row of ware, it will be understood by those skilled in the art that conveyors carrying a plurality of rows of ware can be used. The invention has been successfully practiced with cars carrying as many as ten rows of ware abreast through the kiln, and there is no reason for believing that the number cannot be extended. Means such as burners for introducing a burning gas mixture are indicated at 19. Other batteries of burners, not shown, are located in the opposite wall of the kiln in staggered relation to those shown. These burners introduce burning gas into the firing zone which impinges on the ware so that the ware in passing through is directly exposed to the products of combustion. As is explained in 2,137,091—McDougal, flow of the products of combustion is from the firing zone towards the ware-entrance end of the kiln.

A vent 20 is shown in the ceiling of the cooling zone. The vent should be so disposed as to remove the kiln gases before the temperature thereof has been lowered to the condensation temperature of the above described mineral vapors, but without substantially interfering with gas flow toward the kiln entrance. The temperature of the gases entering the vent in the position shown has been found to be in the neighborhood of 2550° F. Experiments indicate that at a temperature of 2100° F., no condensation occurs, but that at a temperature of 1400° F. condensation does occur. Although the vent may be located anywhere in the kiln at a point where the mineral salts are vaporized, preferably in the cooling zone so as not to interfere with firing, satisfactory performance of the kiln has been obtained by disposing the vent near that portion of the cooling zone which is entered first by the continuously moving ware. This portion may conveniently be called the beginning of the cooling zone.

The vent shown may conveniently comprise a chimney-like structure 22 made of blocks or bricks of any suitable refractory material. A stack 24 may be disposed above the chimney 22 in order to conduct the hot gases away from the immediate vicinity of the tunnel kiln where they might otherwise make living conditions unhealthful.

As is disclosed in 2,137,091—McDougal, flow of the products of combustion is generally from the heating zone toward the preheating zone near the ware-entrance end of the kiln, opposed to the direction of travel of ware through the kiln. It is necessary to the successful operation of the kiln that this fluid or gas flow be substantially unimpaired. However, as stated above, it is likewise desirable to arrest completely all gas flow from the region of the vent toward the ware-exit end of the kiln in order to prevent the condensation of mineral vapors on the ware. By placing the vent near the beginning of the cooling zone, it will be found that gas flow from that point in the kiln toward the ware-exit end thereof is substantially arrested, without material interference with flow toward the ware-entrance end. The size of the vent depends of course on the rest of the kiln, and will differ in kilns of different sizes. The vent should be large enough to remove substantially all gases flowing toward that point in the kiln so that there is no substantial gas flow to the ware-exit end of the kiln, but should not be so large as to interfere with normal gas flow from the firing zone toward the ware-entrance end of the kiln, as explained above.

The quality of the ware produced can be improved considerably by so operating the burners as to produce a reducing atmosphere at the ware-exit end of the firing zone. Preferably, this atmosphere should contain a small percentage of carbon monoxide. A percentage of from 0.5% to 1.0%, approximately, has been found satisfactory. When the kiln is operated to produce the said reducing atmosphere, the ware fired will be found to be bluish-white in color, rather than to have a yellowish tinge, which results from operating the entire firing zone oxidizing. Furthermore, such ware has improved high temperature electrical resistance, which is important in the case of ceramic ware used as electrical insulators. We have found that the Te value of complete spark plugs has thus been increased from approximately 25 megohms to about 45 megohms.

One method of producing a reducing atmosphere at the ware-exit end of the firing zone is to operate the end burners reducing. How many end burners must be so operated depends on the kiln, speed of travel of ware through the kiln, and other circumstances. No definite number of burners is likely to be applicable to all kilns. We have successfully operated the last two burners reducing.

We claim:

1. In a tunnel kiln, a firing zone, a cooling zone, means for continuously passing ware through the zones in succession, means for projecting flame on the ware in said firing zone, means for conducting hot gases from the firing zone toward the ware-entrance end of the kiln, and means to remove uncondensed mineral vapors from the kiln gases without substantially interfering with gas flow toward the ware-entrance end of the kiln, said last mentioned means comprising a chimney above the kiln at the beginning of the cooling zone and at a point where the temperature in the kiln is above the condensation temperature of the mineral vapors.

2. The method of firing ceramic ware which comprises continuously passing the ware through a tunnel kiln having firing and cooling zones, projecting flame directly on the ware in the firing zone, conducting the products of combustion toward the entrance end of the tunnel kiln to preheat the ware, and removing substantially all the uncondensed mineral vapors from the cooling zone before the temperature in the cooling zone is lowered to the condensation temperature of the mineral vapors to prevent condensation of said vapors on the ceramic ware as it passes through the cooling zone.

3. In a tunnel kiln, a firing zone, a cooling zone, means for continuously passing ware through the zones in succession, means for projecting flame upon the ware in the firing zone and vent means located in the ceiling of the tunnel kiln substantially at the beginning of the cooling zone and at a point where the temperature in the kiln is above the condensation temperature of the mineral vapors for removing substantially all of the said vapors from the kiln before the ware is cooled to the condensation point of the said mineral vapors.

4. The method of firing ceramic ware which comprises passing the ware through a tunnel kiln having firing and cooling zones, projecting flame directly on the ware as it passes through the firing zone, and removing substantially all of the uncondensed mineral vapors from the cooling zone before the temperature in the cooling zone is lowered to the condensation temperature of the mineral vapors to prevent condensation of said vapors on the ceramic ware as it passes through the cooling zone.

5. The method of claim 4, in which the atmosphere in the ware-exit end of the firing zone is maintained reducing.

ARTHUR P. WATTS.
KARL SCHWARTZWALDER.